United States Patent [19]

Nishio

[11] Patent Number: 4,843,043

[45] Date of Patent: Jun. 27, 1989

[54] METHOD FOR MANUFACTURING A SINTERED BODY WITH HIGH DENSITY

[75] Inventor: Hiroaki Nishio, Tokyo, Japan

[73] Assignee: Nippon Kokan Kabushiki Kaisha, Tokyo, Japan

[21] Appl. No.: 163,024

[22] Filed: Mar. 2, 1988

[30] Foreign Application Priority Data

Mar. 10, 1987 [JP] Japan ................................. 62-53162

[51] Int. Cl.$^4$ .............................................. C04B 35/58
[52] U.S. Cl. ....................................... 501/97; 264/62; 427/226; 427/372.2
[58] Field of Search ........................... 501/97; 264/62; 427/226, 372.6

[56] References Cited

U.S. PATENT DOCUMENTS

| 3,834,939 | 9/1974 | Beyer et al. | 264/62 |
| 4,112,143 | 9/1978 | Adlerborn et al. | |
| 4,457,958 | 7/1984 | Lange et al. | 264/62 |
| 4,622,186 | 11/1986 | Mizutani | 264/62 |

FOREIGN PATENT DOCUMENTS

| 3403917 | 11/1985 | Fed. Rep. of Germany . |
| 59-116178 | 7/1984 | Japan . |
| 59-35870 | 8/1984 | Japan . |

OTHER PUBLICATIONS

Laine et al; CA 106(2): 5604s.

Primary Examiner—William R. Dixon, Jr.
Attorney, Agent, or Firm—Frishauf, Holtz, Goodman & Woodward

[57] ABSTRACT

A method is provided for manufacturing a sintered body comprising the steps of: heating a membrane of an inorganic polysilazane in liquid formed on the surface of a porous body to oxidize a surface portion of the layer into an oxide layer and still pyrolyzing the remaining of the inorganic polysilazane, the inorganic polysilazane having the formula of $(-SiH_2NH-)n$ where n represents the degree of polymerization; softening the oxide layer to make it impermeable; and sintering the porous body with the oxide layer having impermeability at high pressure and at high temperature n of degree of polymerization ranges 6 to 25. The layer is of 0.5 to 2.0 mm in thickness.

25 Claims, 1 Drawing Sheet

METHOD FOR MANUFACTURING A SINTERED BODY WITH HIGH DENSITY

BACKGROUND OF THE INVENTION

1. Field of the Invention

The present invention relates to a method for manufacturing a sintered body with high density from a ceramic porous body, and more particularly to a method of forming a layer on the surface of the porous body.

2. Description of the Prior Arts

The HIP process (hot isostatic pressing sintering screen) is well known wherein, firstly, metallic or ceramic powders are formed into a compact of a predetermined shape, and the compact is presintered into a presintered body then, a gaseous medium at high temperature and high pressure, such as argon and nitrogen, is applied to the compact or the presintered body whereby the compact or the presintered body is sintered into a sintered body with high density. In this HIP process, such a porous body as the compact or the presintered body is put into a pressure vessel to which high temperature and high pressure are applied and is isostatically pressed by means of a gaseous medium at 600° C. to 2,500° C. and 500 to 3,000 atm. Thus, the porous body is increased in density.

However, owing to this HIP method using a high pressure gas as a medium for applying pressure, it is necessary to prevent the gas from penetrating into the pores of the porous body. As such a measure, the following are known:

(a) a method wherein density of a presintered body is increased to 93% or more of its true density, and more preferably to 95% or more and a presintered body itself is transformed into one impermeable against gas; and (b) a method wherein a compact or a presintered body is arranged in a sealed capsule impermeable against gas, and a gas medium at high temperature and high pressure is applied thereto, whereby the density is increased. This method is applicable to an ordinary compact which has a density of 40 to 75% of true density and is inevitably permeable, or a presintered body which has a density less than 93% of true density.

In method (b), sometimes a porous body is arranged in a capsule prepared in advance and then the capsule is sealed. But, this way is hard to apply to a porous body having a complicated shape and the application of this method is limited to porous body of a simple shape.

In addition, sometimes in method, a powder layers are formed on the surface of the porous body, and heated and softened to have the powder layer transformed into a tightly sealed capsule. When this method is employed, the restriction arising from the shape of the porous body is small, and is particularly useful, for a porous body having a complicated shape.

In Japanese Examined Patent Publication (KOKOKU) No. 35870/84 there is dissolved a process wherein:

(a) on the surface of a preformed body of silicon nitride powders an inner porous layer of a first material and an outer porous layer of a second material are formed;

(b) heat treatment is applied whereby the temperature is high enough to allow the outer porous layer to be transformed into one impermeable against a pressure medium, but at which the inner porous layer still maintains its porous property;

(c) heat treatment is further applied up to a temperature high enough to transform the inner porous layer into one impermeable against a pressure medium;

(d) to the preformed body having had these heat treatments through the inner porous layer and the outer porous layer, isostatic pressing is applied; and (e) the first material constituting the inner porous layer is a powder of high-melting glass, a powder capable of forming a high-melting glass, or a powder of high-melting metal, and the second material constituting the outer porous layer is a powder of low-melting glass, or a powder capable of forming low-melting glass.

There is also disclosed in Japanese Patent Unexamined Publication (KOKAI) No. 116178/84 a process wherein a ceramic porous body is covered with seal material composed of porous high silicate glass or nitride thereof and is sintered at high temperature and at high isostatic pressure to produce a sintered ceramic body with high density.

Further, another prior art method is disclosed in West German Pat. No. 3403917. In this specification, powder layers are formed, on the surface of a porous body, composed of two layers, i.e. an inner layer and an outer layer. The inner layer is of substance not containing a sintering-promoting additive, and the outer layer is of substance containing a sintering-promoting additive. Consequently, the outer layer has characteristic for transforming into an impermeable layer. The inner layer, as a separated layer hard to sinter, has characteristic of making it easy to remove the impermeable layer which has been formed.

These methods, however, have a problem in reliability in formation of a layer, since a preformed porous body is coated with slurry which is made by means of dispersing powders into a solvent. That is to say, since powders are usually cohered if they are used simply an directly in producing slurry, big pores of 30 to 40 microns are brought about in the formed powder layers. Owing to these pores remaining in impermeable layers, formation of the impermeable layers is impaired. Therefore, dispersing the powders is indispensable. In addition, if selection of a solvent is not appropriate, owing to the powders precipitating, formation of layers having uniform density and thickness is impaired. Furthermore, shrinkage occurs during the drying process after the coating and cracking can easily occur. If, in order to lessen the shrinkage, the powder concentration in the slurry is increased, adhesion to the porous body is insufficient. As a result, the layers easily separate to but also lack uniformity in thickness. To avoid the shrinkage and cracking, addition of organic binder is effective, but defects are apt to occur when the organic binder is pyrolyzed. Owing to these various reasons, it has been difficult to form layers reliable enough to maintain impermeability against high pressure.

SUMMARY OF THE INVENTION

It is an object of the present invention to provide a method for the formation of a layer reliable enough to maintain impermeability against high pressure.

To attain the object, in accordance with the present invention, a method is provided for manufacturing a sintered body with high density comprising the steps of:

heating a layer of an inorganic polysilazane liquid formed on the surface of a porous body to oxidize the layer into an oxide layer and then pyrolizing the remaining of the inorganic polysilazane, the inorganic polysilazane having the formula (—SiH$_2$NH—)$_n$ where n represents the degree of polymerization;

softening the oxide layer to make the oxide layer impermeable; and sintering the porous body with the impermeable oxide layer high pressure and at high temperature.

Furthermore, in accordance with the present invention, a method is provided for manufacturing a sintered body with high density comprising the steps of:

heating a layer of a slurry composed of a liquid inorganic polysilazane and ceramic powders on the surface of a porous body to oxidize a surface portion of the layer into an oxide layer and, pyrolyzing the remaining of the inorganic polysilazane, the inorganic polysilazane having the formula (—SiH$_2$NH—)$_n$ where n represents the degree of polymerization;

Softening the oxide layer to make the oxide layer impermeable; and sintering the porous body with the impermeability oxide layer having impermeability at high pressure and at high temperature.

The object and other objects and advantages of the present invention will become more apparent in the detailed description to follow, taken in conjunction with the appended drawings.

DESCRIPTION OF THE PREFERRED EMBODIMENT

Preferred Embodiment 1

Figure 1:
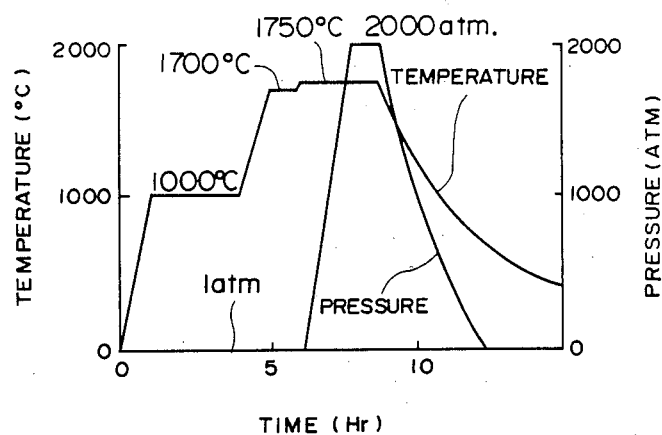
FIG. 1 is a graphic representation showing relation between treatment time and temperature, and relation between treatment time and pressure in regard to Example 1.

An inorganic polysilazane having the formula (—SiH$_2$NH—)$_n$ where n represents degree of polymerization is prepared by using a dihalosilane of the formula SiH$_2$X$_2$, which is composed of at least one of SiH$_2$Cl$_2$, SiH$_2$Br$_2$ and SiH$_2$I$_2$. The combination of more than one of the three is mixed. The dihalosilane and ammonia are reacted in a non-reactive solution, at −70° to 150° C. to be synthesized into the inorganic polysilazane. Solutions of benzene, methyl chloride, diethyl ether and the like can be used. For example, when dichlorosilane SiH$_2$Cl$_2$ is used, the reaction is given by the following formula.

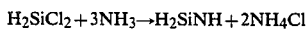

H$_2$SiCl$_2$ + 3NH$_3$ → H$_2$SiNH + 2NH$_4$Cl

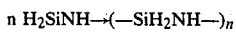

n H$_2$SiNH → (—SiH$_2$NH—)$_n$ n showing the degree of polymerization of the inorganic polysilazane is of key importance; n ranges preferably 6 to 25. If n is 5 or less, the inorganic polysilazane become a very fluid liquid and penetrates into the porous body after the coating. This results in making formation of a layer difficult. If n is 26 or more, the inorganic polysilazane is of high viscosity, and cannot be used for coating. The inorganic polysilazane within the preferable range is liquid and is easy to form into a uniform layer.

In the present invention, a metallic porous body to be formed can be any of metal or metallic group composite material requiring the temperature of 1,300° to 2,200° C. to be sintered. For example, molybdenum, tungsten, molybdenum alloy, and tungsten alloy can be used. WC-Co ultra-hard alloy, and TiC-Ni and TiN-Ni cermets also are available. For a preformed ceramic body, any of ceramics can be used so long as it requires the temperature of 1,300° to 2,200° C. to be sintered. Oxides of elements belonging to II,III and IV groups, carbides, nitrides and borides are preferable. For example, silicon nitride, silicon carbide, titanium boride, titanium carbide and titanium nitride can be mentioned.

As methods of molding porous bodies, those publicly known, i.e. die pressing, rubber pressing, extrusion, and injection molding are available. Porous bodies formed by these methods have densities of 40 to 75% of the true density. Post-treatment can be practiced by means of coating porous bodies obtained by these methods with liquid inorganic polysilazane (—SiH$_2$NH—)$_n$. A presintered body can be a porous body which a metallic or ceramic compact is tranformed into by means of hot press method, pressureless sintering method, gas pressure sintering method to be increased in density, a porous body of reaction sintering silicon nitride, a porous body of reaction sintering silicon carbide or the like. The method of the present invention works effectively when the density of the porous body is less than 93% of true density. This is because HIP treatment can be applied without use of the method of the present invention if the density is 93% or more of true density. But, of course, the method of the present invention can be applied even to a porous body having a density of 93% or more.

In the present invention, the surface of a porous body is coated with inorganic polysilazane. As a method of coating, any of dipping, spraying and brushing can be used. The coating thickness ranges from 0.05 to 2.0 mm. If the thickness is less than 0.05 mm, owing to the dispersion of thickness, there is possibility of impairing the impermeability of the layer. If over 2.0 mm, owing to the porous body being bound, deformation of the porous body sometimes occurs, A liquid inorganic polysilazane layer thus coated requires 3 to 5 days to be solidified when it is left at ordinary temperature, but heating accelerates the solidification. If the heating temperature is over 50° C., pyrolysis accompanying loss in weight begins. The loss in weight is almost completed at 450° C. This pyrolysis is presumed to react in accordance with the formula given below.

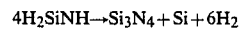

4H$_2$SiNH → Si$_3$N$_4$ + Si + 6H$_2$

The heating temperature preferably ranges from 450° to 1,400° C. If the temperature is lower than 450° C., the pyrolysis of the inorganic polysilazane is not completed. Contrarily, if the temperature is over 1,400° C., in spite of completion of the pyrolysis with, owing to softening or melting of the inorganic polysilazane, the area where the inorganic polysilazane is brought into contact with gas is reduced, and the oxidation to follow is reduced. As a result Si remains, and melt or evaporation of Si causes pores.

The caking and the pyrolysis by heating proceed in the gaseous atmosphere of any one of air, nitrogen, argon and ammonia. If the coking and the pyrolysis are performed in the air, oxidation of metallic silicon as the reaction product and oxidation of the inorganic polysilazane simultaneously proceed. The oxidation of the inorganic polysilazane is performed mainly by moisture in the air, and proceeds partially by work of oxygen. The oxidation of the inorganic polysilazane by the moisture is effected in accordance with the formulas given below, $SiO_2$ and $SiH_2O$ being produced.

$$H_2SiNH + 2H_2O \rightarrow SiO_2 + 2H_2 + NH_3$$

$$H_2SiNH + H_2O \rightarrow SiH_2O + NH_3$$

The oxidation converts $Si_3N_4$ which is hard to densify into $SiO_2$ which is to densify. Thanks to this conversion, impermeable layer having no pores can be formed.

When the heating is carried out in the atmosphere of nitrogen gas, $Si_3N_4$ is produced. Subsequently, $Si_3N_4$ is brought into contact with oxygen or water, and then, $SiO_2$ and $SiH_2O$ are produced. $SiH_2O$ is converted by heating at high temperature into $SiO_2$.

When the heating is carried out in the atmosphere of argon gas, $Si_3N_4$ is produced as in the case of the nitrogen gas atmosphere. By contact with oxygen or water, $SiO_2$ and $SiH_2O$ are produced as well.

In the ammonium atmosphere, $Si_3N_4$ is produced, and $SiO_2$ and $SiH_2$ obtained similarly. To accelerate the oxidation, spraying steam on a porous body or placing the porous body in the humidified atmosphere can be employed. Furthermore, oxidation at 50° C. or less can proceed in advance of pyrolysis. The surface of the coated layer should be wholly transformed at least into oxide.

The layer of the porous body which is pyrolized through heating and oxidized is softened to render it impermeable. This process is carried out by keeping the porous body at 1,300° to 1,800° C. If the temperature is less than 1,300° C., it takes a long to while to densify. This is undesirable for commercial production. In addition, the porous body is easily softened at 1,800° C. to increase density, and raising the temperature more than 1,800° C. is useless from commercial view point. Thus, the porous body is ready to be given HIP treatment.

The temperature and pressure at the time of the HIP treatment is to be determined, depending upon quality of the porous body. However, when the state of impermeable layer is taken into consideration, the preferable temperature is 1,300° to 1,800° C. If the temperature is less than 1,300° C., the viscosity of the impermeable layer fails to follow suitably the shrinkage of the porous body. If over 1,800° C., the impermeable layer is melted away.

Preferred Embodiment 2

In Preferred Embodiment 1, liquid inorganic polysilazane is solely used in forming a layer on the surface of the porous body, but the material used in forming the layer of the present invention is not necessarily limited to the liquid inorganic polysilazane. A further method is provided to use a slurry composed of liquid inorganic polysilazane mixed with ceramic or glass to the extent that the liquid inorganic polysilazane is kept in liquid state in stead. The material to be mixed with liquid inorganic polysilazane can be at least one material selected from the group consisting of TiN powder, AlN powder, $Si_3N_4$ powder SiC powder TiD powder, $B_2O_3$ powder, $Al_2O_3$ powder, MgO powder, $Y_2O_3$ powder and CeO powder. The material mentioned is preferable so as to enable controlling softening point and viscosity of produced layer. In addition, a layer can also be prepared by a method, wherein two different kinds of slurry are prepared, and then, firstly, one kind of slurry is coated on the surface of a porous body and dried, and secondly, the other kind of slurry is coated on the surface of the dried porous body and dried.

Example 1

Powders having a blend ratio of 96 wt. % $Si_3N_4$ and 4 wt. % $Y_2O_3$ were mixed in liquid methanol by means of ball mill for 24 hours, dried and screened through a 100 mesh sieve to remove coase grains therefrom. Thus, material powders to be formed into compacts were prepared. The material powders were put into a metallic mold and formed into a compact of 60 mm×10 mm+12 mm by an axis press forming at 300 kg/cm². Then, the compact was put into a thin rubber pouch, and subsequently formed by rubber press at 3t/cm². The bulk density of 10 porous bodies was 49% of true density.

In the meantime, 30 vol. % methyl chloride was dissolved in 70 vol. % $H_2SiCl_2$ in a 300 ml flask to form a solution, and $NH_3$ was blown in onto the solution continuously and reacted for 2 hours in thermostatic chamber of −10° C. The solvent was volatiled through pressure reduction to be removed. Thus, colorless liquid inorganic polysilazane was obtained.

This inorganic polysilazane was spread on the whole surface of the porous bodies by means of brushing to form layers of the inorganic polysilazane about 0.5 mm in thickness. Subsequently, to oxidize surface portions of the layers and pyrolyze the remaining inorganic polysilazane, the porous bodies with the layers (were heated up to 500° C. at a rate of 3° C./min in a hot blast dryer as air was circulated and were kept at 500° C. for an hour. Then, the porous bodies were naturally cooled.

10 porous bodies thus obtained were charged into HIP equipment, and HIP treatment was applied to them. FIG. 1 graphically represents relation between processing time and temperature and relation between processing time and pressure.

(a) To heat the 10 porous bodies up to 1000° C. as a pressure is reduced.

(b) To keep them at 1,000° C. for 3 hours (finally the degree of vacuum becomes 0.1 mm Torr).

(c) To heat them up to 1,700° C. as nitrogen gas of 1 atm. in term of guage pressure is being supplied.

(d) To keep them at 1,700° C. for an hour.

(e) To heat them up to 1,750° C. as nitrogen gas of 120 atm. is being supplied.

(f) To keep them at 1750° C. and at 2000 atm.

(g) To allow them to cool naturally.

After the natural cooling, 10 samples of the sintered body obtained were sandblasted to take away the surface impermeable layers all the 10 samples made progress in increasing in density. The density has proved to attain 99.4±0.2% of theoretical density.

Example 2

0.02 to 0.04 micron tungsten ultra fine powders in size were put into a metallic mold and were formed by one axis press at 300 kg/cm² into a compact of 60 mm×10 mm×8 mm. The compact was put into a thin rubber pouch, and subsequently formed by rubber press at 5t/cm². The bulk density of 10 porous bodies was 57% of true density.

Inorganic polysilazane prepared in the same method as in Example 1 was spread on the whole surface of the porous bodies by means of brushing to form layers of the inorganic polysilazane about 0.5 mm in thickness. Subsequently, to oxidize surface portions of the layers and pyrolyze the remaining inorganic polysilazane, the porous bodies with the layers were heated up to 500° C. at a rate of 3° C./min. in a hot blast dryer as air was circulated, and were kept at 500° C. for an hour. Then, the porous bodies were left as they were to cool naturally.

Figure 2:
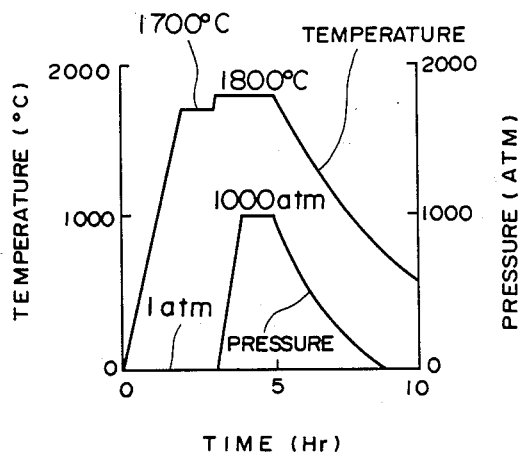
FIG. 2 a graphic representation showing relation between treatment time and temperature, and relation between treatment time and pressure in regard to Example 2.

10 porous bodies thus obtained were charged into a vacuum sintering apparatus. Firstly in the apparatus, the pressure was reduced to $10^{-4}$ Torr at ordinary temperature by means of vacuum suction, and the temperature was raised to 1,000° C. by heating as the vacuum was being maintained, 1,000° C. being kept for 5 hours. Subsequently, the temperature was raised to 1700° C., and was kept for an hour. Then, the 10 porous bodies were left as they were to cool naturally. Samples covered with glass were obtained. These samples were charged into HIP equipment, and HIP treatment was applied to them. FIG. 2 graphically represents relation between processing time and temperature and relation between processing time and pressure. The steps employed were (a) To heat the porous bodies up to 1,700° C. as 1 atm. argon gas is being blown in.

(b) To keep them at 1,700° C. for an hour.

(c) To heat them up to 1,800° C. as 120 atm. argon gas is being supplied.

(d) To keep them at 1,800° C. and at 1,000 atm.

(e) to leave them to cool naturally.

After the natural cooling, 10 samples were sandblasted. All the 10 samples made progress in increasing in density. The density has proved to attain the theoretical density.

Example 3

15 wt. % of inorganic polysilazane prepared in the same method as in the case of Example 1 was dissolved in 50 wt. % of tetrahydrofuran to prepare a solution. With this solution, 35 wt. % of 0.25 micron silicon carbide powder on average size was mixed to prepare slurry A. Next, 15 wt. % in organic polysilazanc was dissolved in 50 wt. % of tetrahydrofrun to form a solution. With this solution, 35 wt. % of 1.5 micron glass powders on average size consisting of 80.4 wt. % $SiO_2$, 12.0 wt. % $B_2O_3$, 4.0 wt. % $Na_2O$; 0.4 wt. % $K_2O$ and 0.3 wt. % CaO to prepare slurry B.

Slurry A was spread by means of blushing on the whole surface of a porous body of silicon nitride produced in the same process as in the case of Example 1, and dried in a hot drier. Furthermore, slurry B was spread with the spread slurry A by brushing and dried on the hot drier. Thus, a 0.5 mm layer composed of slurry A and slurry B in thickness was obtained.

Subsequently, in order to oxidize a surface portion of the layer, and pyrolyze the remaining of the inorganic polysilazane, the porous body with the layer was heated up to 500° C. at a rate of 3° C/min. in a hot blast drier as air was circulated, and kept at 500° C. for an hour. An then, the porous body was left to cool naturally.

10 porous bodies thus obtained, were put into HIP equipment and HIP treatment was applied thereto.

The HIP treatment was carried out on the same terms and conditions with those of Example 1. After natural cooling, the 10 samples were sandblasted to remove the surface impermeable layers. All the samples made progress in increasing in density. The density was 99.4±0.2% of the theoretical density.

Control 10 compacts of silicon nitride were prepared in the same steps as in the case of Example 1. In the meantime, 20 wt. % of glass powders having composition of 96.7 wt. % $SiO_2$, 2.9 wt. % $B_2O_2$ and 0.4 wt. % $Al_2O_3$ was mixed with 80 wt. % isopropyl alcohol to form a mixture. The mixture was dispersed by means of a supersonic wave device the transformed into slurry. Said compacts were dipped into the slurry, and then were dried at 200° C. in a hot blast drier for an hour. Thus, porous bodies with glass powders adhered thereto were obtained.

HIP treatment was applied to the porous bodies in the same steps taken as in the case of Example 1. 6 of the 10 porous bodies did not make progress in increase in density. In these 6 porous bodies, there were voids between each of sintered bodies and each of glass layers thereof to be found. The other 4 porous bodies increased in density, but the glass layers each stuck so firmly to the respective sintered bodies that it was difficult to remove the glass layers perfectly from the sintered bodies by sandblasting. As a result the exact measurement of the density was not obtained. But, the density reached 99% of the theoretical density.

What is claimed is:

1. A method for manufacturing a sintered body with high density which comprises the steps of:

heating a layer comprising a liquid inorganic polysilazane positioned on the surface of a porous body to oxidize a surface portion of said layer to an oxide layer and pyrolyzing the remainder of the inorganic polysilazane, said inorganic polysilazane having the formula $(-SiH_2NH-)_n$ wherein n represents the polymerization degree and is from 6 to 25;

softening said oxide layer to make the oxide layer impermeable; and sintering the porous body with said impermeable oxide layer at a high pressure and at a high temperature.

2. The method of claim 1, wherein said porous body is a metallic porous body or a ceramic porous body.

3. The method of claim 2, wherein said porous body includes a porous body which is formed and presintered.

4. The method of claim 1, wherein said inorganic polysilazane comprises an inorganic polysilazane which has been synthesized by reacting a dihalosilane of the formula of $SiH_2X_2$ and ammonia $NH_3$ in a non-reactive solution where X is at least one element selected from the group consisting of Cl, Br and I.

5. The method of claim 1, wherein said liquid layer of said inorganic polysilazane positioned on the surface of said porous body is from 0.0 5 to 2.0 mm thick.

6. The method of claim 1, wherein said heating step is at a temperature of from 450° C. to 1,400° C. in a gaseous atmosphere.

7. The method of claim 6, wherein said gaseous atmosphere is selected from the group consisting of air, nitrogen, argon and ammonia.

8. The method of claim 7, wherein said gaseous atmosphere contains moisture.

9. The method of claim 1, wherein said step of making the oxide layer impermeable comprises maintaining the oxide layer at 1,300° to 1,800° C. to increase the density of the oxide layer.

10. The method of claim 1, wherein said step of sintering the porous body with the impermeable oxide layer comprises sintering the porous body by applying hot isostatic pressure to the porous body at 1,300° C. to 2,200° C.

11. The method of claim 2, wherein said layer of said inorganic polysilazane positioned on the surface of said porous body is from 0.0 5 to 2.0 mm thick;
said heating step is at a temperature of from 450° to 1,400° C. in a gaseous atmosphere;
said gaseous atmosphere is selected from the group consisting of air, nitrogen, argon and ammonia and said atmosphere also contains moisture;
said step of making the oxide layer impermeable comprises maintaining the oxide layer at 1,300° to 1,800° C. to increase the density of the oxide layer; and
said step of sintering the porous body with the impermeable oxide layer comprises sintering the porous body by applying hot isostatic pressure to the porous body at 1,300° C. to 2,200° C.

12. The method of claim 11, wherein said porous body includes a porous body which is formed and presintered.

13. The method of claim 12, wherein said inorganic polysilazane comprises an inorganic polysilazane which has been synthesized by reacting a dihalosilane of the formula of $SiH_2X_2$ and ammonia $NH_3$ in a non-reactive solution where X is at least one element selected from the group consisting of Cl, Br and I.

14. The method of claim 1, wherein said step of sintering the porous body with the impermeable oxide layer comprises sintering the porous body by applying hot isostatic pressure to the porous body at 1,300° C. to 1,800° C.

15. A method for manufacturing a sintered body with high density which comprises the steps of:
heating a slurry layer comprising a liquid inorganic polysilazane and ceramic powder positioned on the surface of a porous body to oxidize a surface portion of said layer to an oxide layer and pyrolyzing the remainder of the inorganic polysilazane, said inorganic polysilazane having the formula $(-SiH_2NH-)_n$ wherein n represents the polymerization degree and is from 6 to 25;
softening the oxide layer to make the oxide layer impermeable; and
sintering the porous body with said impermeable oxide layer at a high pressure and at a high temperature.

16. The method of claim 15, wherein said ceramic powder is at least one member selected from the group consisting of TiN powder, AlN powder, SiC powder, TiC powder, $B_2O_3$ powder, $Al_2O_3$ powder, MgO powder, $Y_2O_3$ powder, CeO powder and glass powder.

17. The method of claim 15, wherein said liquid layer of an inorganic polysilazane positioned on the surface of said porous body is from 0.05 to 2.0 mm in thickness.

18. The method of claim 15, wherein said heating step is at a position of from 450° to 1400° C. in a gaseous atmosphere.

19. The method of claim 18, wherein said gaseous atmosphere is selected from the group consisting of air, nitrogen, argon and ammonia.

20. The method of claim 15, wherein said gaseous atmosphere contains moisture.

21. The method of claim 15, wherein said step of making the oxide layer impermeable comprises maintaining the oxide layer at 1,300° to 1,800° C. to increase density of the oxide layer.

22. The method of claim 15, wherein said step of sintering the porous body having the impermeable oxide layer comprises sintering by applying hot isostatic pressure at 1,300° to 2,200° C.

23. The method of claim 15, wherein said slurry layer comprises a layer of a first slurry and a second slurry, the first slurry being coated on the surface of the porous body and dried to form a first layer and then the second slurry is coated on said first layer.

24. The method of claim 14, wherein
said layer of liquid inorganic polysilazane positioned on the surface of said porous body is from 0.05 to 2.0 mm in thickness;
said heating step at a temperature of from 450° to 1400° C. in a gaseous atmosphere;
wherein said gaseous atmosphere is selected from the group consisting of air, nitrogen, argon and ammonia and also contains moisture;
said step of making the oxide layer impermeable comprises maintaining the oxide layer at 1,300° to 1,800° C. to increase density of the oxide layer; and
said step of sintering the porous body having the impermeable oxide layer comprises sintering by applying hot isostatic pressure at 1,300° -2,200° C.

25. The method of claim 24, wherein said step of sintering the porous body having the impermeable oxide layer comprises sintering by applying hot isostatic pressure at 1,300° to 1,800° C.

* * * * *

UNITED STATES PATENT AND TRADEMARK OFFICE
CERTIFICATE OF CORRECTION

PATENT NO. : 4,843,043

DATED : June 27, 1989

INVENTOR(S) : NISHIO et al

Page 1 of 2

It is certified that error appears in the above-identified patent and that said Letters Patent is hereby corrected as shown below:

Column 1, line 16, change "then a" to --. Then a--.

Column 2, line 31, delete "of".

Column 2, line 37, change "an" to --and--.

Column 2, line 50, delete "to".

Column 3, line 6, insert "at" after "layer".

Column 3, line 19, change "impermeability" to --impermeable--.

Column 3, line 20, delete "having impermeability".

Column 3, line 41, insert "the" following "represents".

Column 3, line 48, change "benzenc" to --benzene--.

Column 4, line 6, delete "of".

Column 4, line 6, change "ceramics" to --ceramic--.

Column 4, line 47, insert --with-- after "pyrolysis".

Column 5, line 12, insert --easy- after "which is".

Column 5, line 31, insert --oxide-- after "The".

Column 5, line 35, delete "to".

Column 5, line 60, delete "instead".

Column 6, line 15, change "+ 12 mm" to --x 12 mm--.

UNITED STATES PATENT AND TRADEMARK OFFICE
CERTIFICATE OF CORRECTION

PATENT NO. : 4,843,043

DATED : June 27, 1989

INVENTOR(S) : NISHIO et al

It is certified that error appears in the above-identified patent and that said Letters Patent is hereby corrected as shown below:

Column 6, line 41, insert --The steps employed were:-- after "pressure".

Column 7, line 24, insert -- : -- after "were".

Column 7, line 32, change "to leave" to --to allow--.

Column 7, line 44, change "polysilazanc" to --polysilazane--.

Column 8, line 11, change "the" to --and--.

Column 8, line 11, change "said" to --The--.

Column 8, line 18, delete "make progress in".

Column 10, claim 24, line 33, change "of claim 14" to --of claim 16--.

Abstract, line 7, delete "of".

Signed and Sealed this

Fourteenth Day of January, 1992

*Attest:*

HARRY F. MANBECK, JR.

*Attesting Officer*  *Commissioner of Patents and Trademarks*